(12) United States Patent
Isami et al.

(10) Patent No.: US 12,734,902 B2
(45) Date of Patent: Sep. 15, 2026

(54) ELECTRIC VEHICLE

(71) Applicant: TOYOTA JIDOSHA KABUSHIKI KAISHA, Toyota (JP)

(72) Inventors: Yoichiro Isami, Mishima (JP); Ryohei Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/171,625

(22) Filed: Apr. 7, 2025

(65) Prior Publication Data

US 2025/0376044 A1 Dec. 11, 2025

(30) Foreign Application Priority Data

Jun. 5, 2024 (JP) ................................ 2024-091689

(51) Int. Cl.
*B60L 15/20* (2006.01)
*B60K 1/02* (2006.01)
*B60K 23/08* (2006.01)

(52) U.S. Cl.
CPC ............ *B60L 15/2009* (2013.01); *B60K 1/02* (2013.01); *B60K 23/0808* (2013.01); *B60L 2240/461* (2013.01); *B60L 2240/463* (2013.01); *B60L 2240/465* (2013.01); *B60L 2250/28* (2013.01)

(58) Field of Classification Search
CPC ........... B60L 15/2009; B60L 2240/461; B60L 2240/463; B60L 2240/465; B60L 2250/28; B60L 2250/16; B60L 2260/24; B60L 2260/28; B60L 15/2054; B60L 2240/42; B60L 2240/423; B60K 1/02; B60K 23/0808; Y02T 10/72; Y02T 10/64; B60Y 2200/91; B60Y 2400/82
See application file for complete search history.

(56) References Cited

U.S. PATENT DOCUMENTS

2010/0166210 A1* 7/2010 Isozaki ..................... B60L 3/00 381/86
2021/0229550 A1 7/2021 Isami
2023/0234589 A1* 7/2023 Kanzaki .............. B60L 15/2081 701/22
2024/0083259 A1* 3/2024 Ikezawa ................. B60L 15/20
2024/0166057 A1* 5/2024 Isami ...................... B60L 15/20

FOREIGN PATENT DOCUMENTS

JP 6787507 B1 11/2020

* cited by examiner

*Primary Examiner* — Behrang Badii
(74) *Attorney, Agent, or Firm* — Sughrue Mion, PLLC

(57) ABSTRACT

A controller of an electric vehicle is configured to switch an output mode of a virtual engine speed between a first mode and a second mode in accordance with a predetermined condition. The first mode is an output mode in which the virtual engine speed is changed with reference to a wheel rotation speed of front wheels of the electric vehicle or a first rotation speed associated with the wheel rotation speed of the front wheels. The second mode is an output mode in which the virtual engine speed is changed with reference to a wheel rotation speed of rear wheels of the electric vehicle or a second rotation speed associated with the wheel rotation speed of the rear wheels.

7 Claims, 7 Drawing Sheets

| | | OUTPUT MODE OF VIRTUAL ENGINE SPEED |
| --- | --- | --- |
| FOUR WHEEL DRIVE MODE | | SWITCH OUTPUT MODE IN ACCORDANCE WITH PREDETERMINED CONDITION |
| TWO WHEEL DRIVE MODE | FRONT WHEEL DRIVE MODE | FIX OUTPUT MODE TO FIRST MODE |
| | REAR WHEEL DRIVE MODE | FIX OUTPUT MODE TO SECOND MODE |

FIG. 4

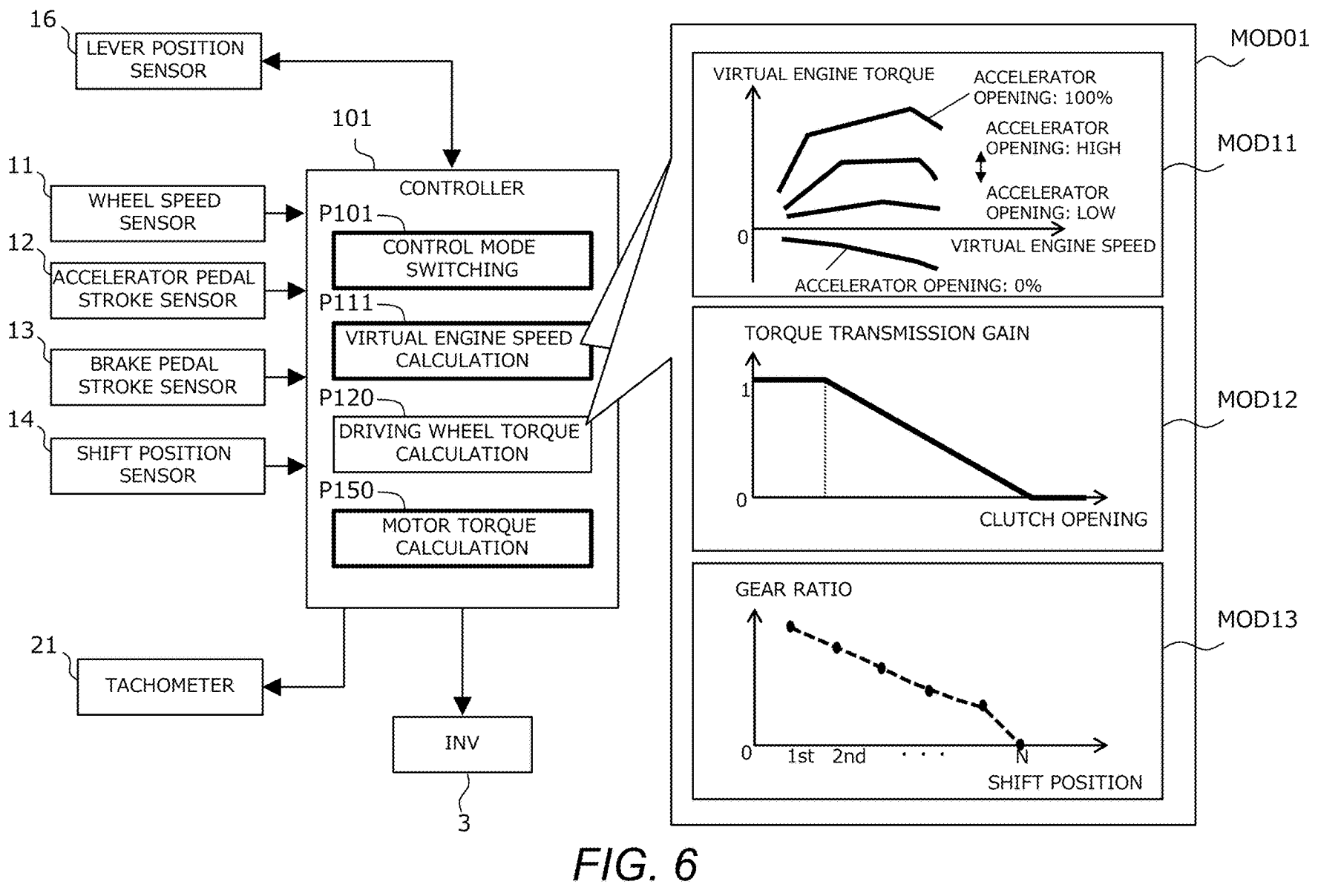

16 LEVER POSITION SENSOR

11 WHEEL SPEED SENSOR

12 ACCELERATOR PEDAL STROKE SENSOR

13 BRAKE PEDAL STROKE SENSOR

14 SHIFT POSITION SENSOR

21 TACHOMETER

101 CONTROLLER

P101 CONTROL MODE SWITCHING

P111 VIRTUAL ENGINE SPEED CALCULATION

P120 DRIVING WHEEL TORQUE CALCULATION

P150 MOTOR TORQUE CALCULATION

INV 3

MOD01

MOD11

VIRTUAL ENGINE TORQUE

ACCELERATOR OPENING: 100%

ACCELERATOR OPENING: HIGH

ACCELERATOR OPENING: LOW

ACCELERATOR OPENING: 0%

VIRTUAL ENGINE SPEED

0

MOD12

TORQUE TRANSMISSION GAIN

1

0

CLUTCH OPENING

MOD13

GEAR RATIO

0

1st 2nd ... N

SHIFT POSITION

FIG. 6

ELECTRIC VEHICLE

CROSS-REFERENCE TO RELATED APPLICATION

The present application claims priority under 35 U.S.C. § 119 to Japanese Patent Application No. 2024-091689, filed on Jun. 5, 2024, the contents of which application are incorporated herein by reference in their entirety.

BACKGROUND

Field

The present disclosure relates to an electric vehicle having an electric motor as a drive source.

Background

Patent Document 1 discloses a conventional technique relating to an electric vehicle that can artificially reproduce a manual gear shift operation of a manual transmission vehicle using an internal combustion engine as a drive source by controlling an electric motor (i.e., rotating machine). In particular, Patent Document 1 discloses that a virtual engine speed of a virtual engine is calculated based on a rotation speed of a propeller shaft (i.e., shaft rotation speed) connected to an electric motor.

LIST OF RELATED ART

Patent Document 1: Japanese Patent No. 6787507

SUMMARY

An electric vehicle configured to be able to drive front wheels and rear wheels respectively is considered. In a manual transmission vehicle using an internal combustion engine as a drive source, the engine speed may be determined by the wheel rotation speed of the front wheels or the wheel rotation speed of the rear wheels depending on the operating state of the drive system. Therefore, in an electric vehicle simulating such a vehicle, a value referred to in calculation of the virtual engine speed should be switched between the front wheel side and the rear wheel side depending on the operating state of the drive system. However, when the technique disclosed in Patent Document 1 is applied, it is not specified which of the rotation speed of the front wheel side and the rotation speed of the rear wheel side is referred to, and therefore, there is a possibility that a virtual engine speed that does not match the operating state of the drive system of the electric vehicle is output. If the virtual engine speed that does not match the operating state of the drive system is displayed to a driver, the driver who expects the driving feeling of the manual transmission vehicle using the internal combustion engine as the drive source feels a sense of discomfort.

The present disclosure has been made in view of the above problems. An object of the present disclosure is to provide a technique capable of outputting an appropriate virtual engine speed in accordance with an operating state of a drive system of an electric vehicle.

The present disclosure provides an electric vehicle for achieving the above object. The electric vehicle includes an indicator that displays a virtual engine speed of a virtual engine, and a controller. The controller is configured to switch an output mode of the virtual engine speed between a first mode and a second mode in accordance with a predetermined condition. The first mode is an output mode in which the virtual engine speed is changed with reference to a wheel rotation speed of front wheels of the electric vehicle or the first rotation speed associated with the wheel rotation speed of the front wheels. The second mode is an output mode in which the virtual engine speed is changed with reference to a wheel rotation speed of rear wheels of the electric vehicle or a second rotation speed associated with the wheel rotation speed of the rear wheels.

According to the present disclosure, it is possible to output an appropriate virtual engine speed in accordance with an operating state of a drive system of an electric vehicle.

BRIEF DESCRIPTION OF DRAWINGS

FIG. 4 is a table showing a correspondence relationship in a case where the output mode of the virtual engine speed is determined according to a control mode;

FIG. 6 is a diagram showing a configuration of a controller related to drive control of the electric vehicle according to the second embodiment.

DETAILED DESCRIPTION

Figure 1:
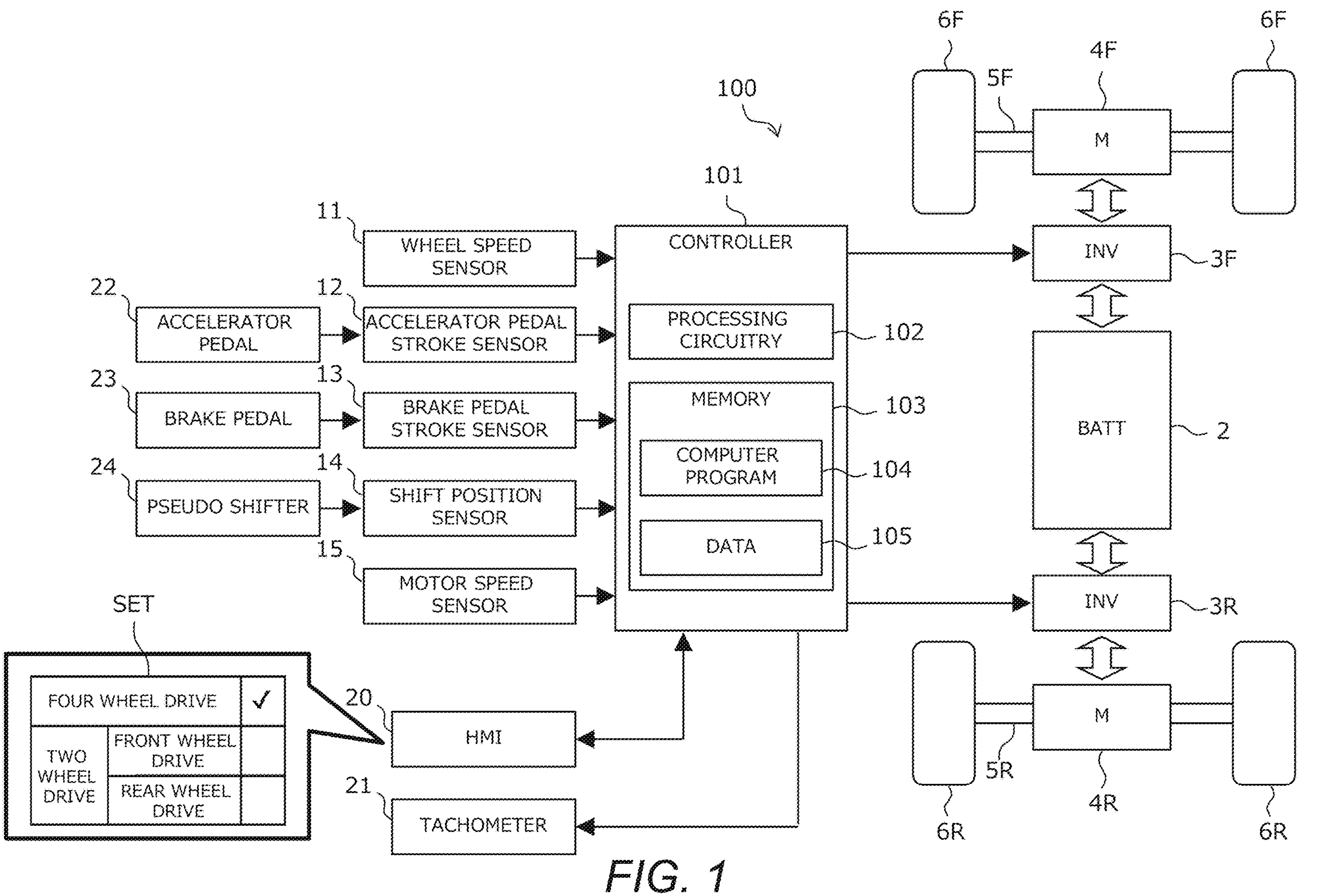
FIG. 1 is a diagram schematically showing a configuration of an electric vehicle according to a first embodiment.

Hereinafter, embodiments of the present disclosure will be described with reference to the accompanying drawings. In the drawings, the same or corresponding components are denoted by the same reference numerals, and the description thereof will be simplified or omitted.

1. First Embodiment

1-1. Configuration of Power System of Electric Vehicle

FIG. 1 is a diagram schematically showing a configuration of an electric vehicle 100 according to the first embodiment. First, a configuration of a power system of an electric vehicle 100 according to the first embodiment will be described with reference to FIG. 1.

The electric vehicle 100 includes a front electric motor (M) 4F at the front side and a rear electric motor (M) 4R at the rear side as drive sources. The electric motors 4F, 4R are, for example, three phase alternating current motors. A front inverter (INV) 3F and a rear inverter (INV) 3R are attached to the front electric motor 4F and the rear electric motor 4R, respectively. The front electric motor 4F is provided to drive front wheels 6F, and is connected to a front drive shaft 5F via a reduction gear and a differential mechanism. The rear electric motor 4R is provided to drive rear wheels 6R, and is connected to a rear drive shaft 5R via a reduction gear and a differential mechanism. The front electric motor 4F and the front inverter 3F, and the rear electric motor 4R and the rear inverter 3R, may each be designed as e-axles.

The front inverter 3F and the rear inverter 3R are respectively connected to a battery (BATT) 2. That is, the electric vehicle 100 is a battery electric vehicle (BEV) that travels with electric energy stored in the battery 2. The inverters 3F and 3R are, for example, voltage-type inverters, and control the torques of the electric motors 4F and 4R by PWM control.

1-2. Configuration of Control System of Electric Vehicle

Next, a configuration of a control system of the electric vehicle 100 will be described with reference to FIG. 1.

The electric vehicle 100 includes wheel speed sensors 11. Each of the wheel speed sensors 11 is provided on the left and right front wheels 6F and the left and right rear wheels 6R, respectively. Each of the wheel speed sensors 11 outputs a signal indicating a wheel rotation speed of the left and right front wheels 6F and a wheel rotation speed of the left and right rear wheels 6R. Each of the wheel speed sensors 11 is also used as a vehicle speed sensor that outputs a signal indicating the vehicle speed of the electric vehicle 100 from the detected wheel rotation speed.

The electric vehicle 100 includes an accelerator pedal stroke sensor 12. The accelerator pedal stroke sensor 12 is provided on an accelerator pedal 22. The accelerator pedal stroke sensor 12 outputs a signal indicating a depression amount of the accelerator pedal 22, that is, an accelerator opening.

The electric vehicle 100 includes a brake pedal stroke sensor 13. The brake pedal stroke sensor 13 is provided on a brake pedal 23. The brake pedal stroke sensor 13 outputs a signal indicating a depression amount of the brake pedal 23, that is, a brake depression amount.

The accelerator pedal 22 and the brake pedal 23 are driving operation members used for driving the electric vehicle 100. Apart from these driving operation members, the electric vehicle 100 includes a pseudo shifter 24 that simulates a shifter used for a gear shift operation of a manual transmission type engine vehicle (a vehicle using an internal combustion engine as a drive source). The pseudo shifter 24 is, for example, a pseudo sequential shifter that simulates a sequential shifter such as a paddle shifter. Alternatively, the pseudo shifter 24 may be a pseudo H-type shifter which simulates the H-type shifter. In particular, hereinafter, the pseudo shifter 24 is assumed to be a pseudo paddle shifter which simulates a paddle shifter.

The pseudo shifter 24 has a structure similar to a shift paddle attached to a steering wheel or a steering shaft, and is configured to be able to independently operate the left and right paddles. The pseudo shifter 24 is provided with a shift position sensor 14. The shift position sensor 14 outputs an upshift signal when the right paddle is pulled, and outputs a downshift signal when the left paddle is pulled.

The electric vehicle 100 includes a motor speed sensor 15. The motor speed sensor 15 is provided in each of the front electric motor 4F and the rear electric motor 4R. The motor speed sensor 15 detects a motor rotation speed of the front electric motor 4F and the rotation speed of the rear electric motor 4R.

The electric vehicle 100 also includes a human-machine interface (HMI) 20 as an interface with a driver, and a tachometer 21. The HMI 20 presents various kinds of information to the driver by display or sound, and receives various kinds of input from the driver. The HMI 20 is configured by a display (for example, a multi-information display or a meter display), a speaker, a switch, a microphone, a touch pad, a touch screen, or the like. For example, the HMI 20 displays various kinds of information on the display and receives input with respect to the display content from a driver operating the switches. For example, the HMI 20 displays various kinds of information on the touch screen and receives input with respect to the display content through touch operation on the touch screen by a driver. The tachometer 21 is an indicator that displays a virtual engine speed, which will be described later, to a driver. The tachometer 21 may be implemented by a part of the functions of the HMI 20. For example, the HMI 20 may display a display indicating the tachometer 21 on the display. In this case, the display of the HMI 20 functions as the tachometer 21.

The electric vehicle 100 includes a controller 101. Various sensors and devices to be controlled mounted on the electric vehicle 100 are connected to the controller 101 via an in-vehicle network such as a controller area network (CAN). Various sensors other than the wheel speed sensors 11, the accelerator pedal stroke sensor 12, the brake pedal stroke sensor 13, the shift position sensor 14, and the motor speed sensor 15 may be mounted on the electric vehicle 100 and connected to the controller 101 via the in-vehicle network.

The controller 101 generates control signals for various controls of the electric vehicle 100 based on signals acquired from the sensors. The controller 101 is typically an electronic control unit (ECU). The controller 101 may be a combination of a plurality of ECUs. The controller 101 includes at least processing circuitry 102 and a memory 103.

The processing circuitry 102 may be implemented as, for example, a general-purpose processor, a special-purpose processor, a central processing unit (CPU), a graphics processing unit (GPU), an application specific integrated circuit (ASIC), a field-programmable gate array (FPGA), an integrated circuit, a conventional circuit, or a combination of one or more of these. In general, a processor including transistors and other circuitry is an example of processing circuitry 102. The processing circuitry 102 may also be referred to as circuitry. The circuitry may be hardware programmed to implement the functionality of the controller 101 or may be hardware that performs the functionality of the controller 101. The number of processing circuitry 102 included in the controller 101 may be plural.

The memory 103 stores various kinds of information necessary for execution of processing of the processing circuitry 102. The memory 103 is configured by a recording medium such as a random access memory (RAM), a read only memory (ROM), a solid state drive (SSD), or a hard disk drive (HDD). The memory 103 stores a computer program 104 executable by the processing circuitry 102 and various data 105. The computer program 104 is configured by a plurality of instruction codes describing processing to be executed by the processing circuitry 102. The computer program 104 is recorded in a computer-readable recording medium. The processing circuitry 102 that executes the computer program 104 and the memory 103 cooperate with each other to realize the functions of the controller 101. The memory 103 may be built into the processing circuitry 102.

The controller 101 has at least two control modes, i.e., a four wheel drive mode and a two wheel drive mode, for controlling the electric vehicle 100. The four wheel drive mode is a control mode in which both the front wheels 6F and the rear wheels 6R are driven. That is, in the four wheel drive mode, the controller 101 drives the front wheels 6F by controlling the front electric motor 4F via the front inverter 3F, and drives the rear wheels 6R by controlling the rear electric motor 4R via the rear inverter 3R. The two wheel drive mode is a control mode in which only one of the front wheels 6F and the rear wheels 6R is driven. In particular, the two wheel drive mode includes a front wheel drive mode in which only the front wheels 6F are driven and a rear wheel drive mode in which only the rear wheels 6R are driven. That is, in the front wheel drive mode, the controller 101 drives only the front wheels 6F by controlling the front electric motor 4F via the front inverter 3F. In the rear wheel drive mode, the controller 101 drives only the rear wheels 6R by controlling the rear electric motor 4R via the rear inverter 3R.

The control mode is selected by the driver operating the HMI 20. The HMI 20 is configured to receive a selection input of the control mode from the driver. FIG. 1 shows an example of a setting screen SET of the control mode. For example, the HMI 20 displays the setting screen SET on a display or a touch screen. The HMI 20 receives a selection input by the driver from among the control modes displayed on the setting screen SET. For example, the driver selects a desired control mode by operating a switch or touching a touch screen. In the example shown in FIG. 1, the four wheel drive mode is selected.

The controller 101 controls the electric vehicle 100 according to the selected control mode. In particular, the controller 101 controls the electric motors 4F and 4R in accordance with the driving operation of the driver, thereby performing the drive control of the electric vehicle 100. The drive control of the electric vehicle 100 by the controller 101 will be described below.

1-3. Drive Control of Electric Vehicle

Figure 2:
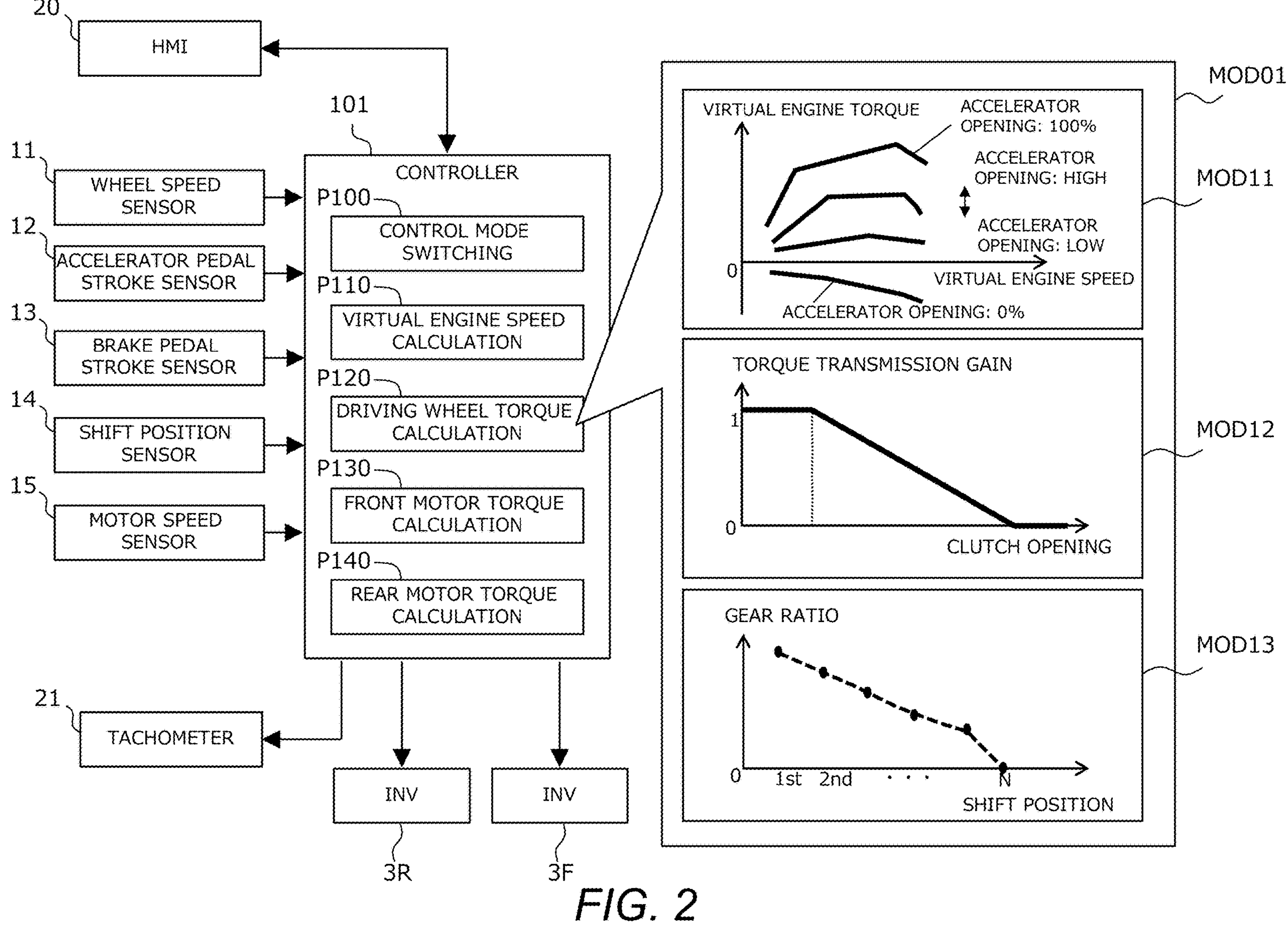
FIG. 2 is a diagram showing a configuration of a controller related to drive control of the electric vehicle according to the first embodiment.

FIG. 2 is a diagram showing a configuration of the controller 101 related to the drive control of the electric vehicle 100 according to the first embodiment.

A control mode signal is input to the controller 101 from the HMI 20. The control mode signal includes information on the control mode selected by the driver. The controller 101 executes process P100 based on the control mode signal. In the process P100, the control mode is switched according to the control mode signal. In particular, the controller 101 switches the control mode to any one of the four wheel drive mode, the front wheel drive mode, and the rear wheel drive mode by executing the process P100.

The drive control of the electric vehicle 100 by the controller 101 is performed so as to simulate drive characteristics of a virtual vehicle that is a manual transmission type engine vehicle. For this purpose, the controller 101 initially executes a process P110 for calculating a virtual engine speed of a virtual engine in the virtual vehicle. In the process P110, the virtual engine speed is calculated from the motor rotation speed acquired from the motor speed sensor 15. For example, in the process P110, the virtual engine speed is calculated from the motor rotation speed by using a map that defines the relationship between the motor rotation speed and the virtual engine speed. The controller 101 displays the virtual engine speed calculated by the execution of the process P110 on the tachometer 21.

The motor rotation speed acquired from the motor speed sensor 15 includes two motor rotation speeds, i.e., the motor rotation speed of the front electric motor 4F (hereinafter referred to as "front motor rotation speed") and the motor rotation speed of the rear electric motor 4R (hereinafter referred to as "rear motor rotation speed"). Therefore, the controller 101 has two output modes with respect to the virtual engine speed calculated in the process P110. That is, the controller 101 has an output mode (hereinafter, referred to as a "first mode") in which the front motor rotation speed is referred to and an output mode (hereinafter, referred to as a "second mode") in which the rear motor rotation speed is referred to. The controller 101 is configured to be able to switch the output mode of the virtual engine speed between a first mode and a second mode. The switching of the output mode of the virtual engine speed will be described later.

After the execution of the process P110, the controller 101 executes process P120 for calculating a torque (hereinafter, referred to as a "driving wheel torque") to be generated in driving wheels. A vehicle model MOD01 obtained by modeling a virtual vehicle is used for the calculation of the driving wheel torque in the process P120. The vehicle model MOD01 includes an engine model MOD11, a clutch model MOD12, and a transmission model MOD13. In the engine model MOD11, a virtual engine of a virtual vehicle is modeled. In the clutch model MOD12, a virtual clutch of the virtual vehicle is modeled. In the transmission model MOD13, a virtual transmission of the virtual vehicle is modeled. The vehicle model MOD01 is generated in advance and stored in the memory 103 as data 105.

The engine model MOD11 calculates a virtual engine torque from the virtual engine speed and the accelerator opening. The virtual engine speed is acquired from the execution result of the process P110. The accelerator opening is acquired from a signal of the accelerator pedal stroke sensor 12. In the engine model MOD11, the relationship between the virtual engine speed and the virtual engine torque is defined for each accelerator opening. The engine characteristics of the engine model MOD11 may be selected by the driver through an operation of the HMI 20.

The clutch model MOD12 calculates a torque transmission gain. The torque transmission gain is a gain for calculating a torque transmission rate of the virtual clutch corresponding to the clutch opening. In the clutch model MOD12, the torque transmission gain is given to the clutch opening. In the clutch model MOD12, a value obtained by subtracting the torque transmission gain from 1 is calculated as a slip ratio of the virtual clutch.

Here, the clutch opening is calculated using a clutch operation model. The clutch operation model is a model simulating clutch operation of a model driver. The clutch operation model receives the vehicle speed, the virtual engine speed, and a signal from the shift position sensor 14. The signal from the shift position sensor 14 is used to count the timing of the clutch operation. When the shift operation of the driver is detected by the signal from the shift position sensor 14, the clutch opening is maximized in the clutch operation model so as to disengage the virtual clutch. The vehicle speed and the virtual engine speed are used for calculation of the clutch opening. In the clutch operation model, the clutch opening is calculated based on a rotation speed difference between a rotation speed of an input shaft of the virtual transmission calculated from the vehicle speed and the virtual engine speed such that the rotation speed of the input shaft of the virtual transmission and the virtual engine speed smoothly coincide with each other.

The torque transmission gain is converted into a clutch torque capacity of the virtual clutch, that is, virtual clutch torque capacity. Then, the virtual clutch torque input from the virtual clutch to the virtual transmission is calculated based on a comparison between the virtual clutch torque capacity and the virtual engine torque calculated by the engine model MOD11.

The transmission model MOD13 calculates a virtual gear ratio. The virtual gear ratio is a gear ratio determined by a virtual shift position in the virtual transmission. The virtual gear ratio is set for each shift position. The maximum virtual gear ratio is set for a first stage, and the virtual gear ratio is reduced in the order of a second stage, a third stage, a fourth stage, and so on. The shift position is determined by a signal from the shift position sensor 14. Specifically, when an upshift signal is output from the shift position sensor 14, the shift position is shifted up by one stage. When a downshift signal is output from the shift position sensor 14, the shift position is shifted down by one stage.

The transmission model MOD13 further calculates a virtual transmission torque using the virtual gear ratio and the virtual clutch torque. The virtual transmission torque is a virtual torque output from the virtual transmission.

The vehicle model MOD01 calculates the driving wheel torque from the virtual transmission torque and a reduction ratio. In this way, in the process P120, the controller 101 calculates the driving wheel torque according to the depression amount of the accelerator pedal 22 (accelerator opening) and the virtual engine speed calculated in the process P110 using the vehicle model MOD01.

After the execution of the process P120, the controller 101 executes a process P130 and a process P140 according to the control mode. The process P130 is a process for calculating a torque to be generated in the front electric motor 4F. The process P140 is a process for calculating a torque to be generated in the rear electric motor 4R.

When the control mode is set to the four wheel drive mode, the driving wheel torque calculated in the process P120 is a total torque of a torque applied to the left and right front wheels 6F and a torque applied to the left and right rear wheels 6R. Therefore, in the process P130, a torque (hereinafter referred to as "front motor torque") to be generated in the front electric motor 4F is calculated by multiplying the driving wheel torque calculated in the process P120 by a torque distribution ratio to the front wheels 6F and a reduction ratio from an output shaft of the front electric motor 4F to the front wheels 6F. In the process P140, a torque (hereinafter referred to as "rear motor torque") to be generated in the rear electric motor 4R is calculated by multiplying the driving wheel torque calculated in the process P120 by a torque distribution ratio to the rear wheels 6R and a reduction ratio from an output shaft of the rear electric motor 4R to the rear wheels 6R. In the four wheel drive mode, the controller 101 may fix the torque distribution to the front wheels 6F and the rear wheels 6R, or may actively or passively change the torque distribution.

When the control mode is set to the front wheel drive mode, the driving wheel torque calculated in the process P120 is a torque to be applied to the left and right front wheels 6F. Therefore, in the process P130, the front motor torque is calculated by multiplying the driving wheel torque calculated in the process P120 by the reduction ratio from the output shaft of the front electric motor 4F to the front wheels 6F. On the other hand, in the process P140, the rear motor torque is set to zero.

When the control mode is set to the rear wheel drive mode, the driving wheel torque calculated in the process P120 is a torque to be applied to the left and right rear wheels 6R. Therefore, in the process P140, the rear motor torque is calculated by multiplying the driving wheel torque calculated in the process P120 by the reduction ratio from the output shaft of the rear electric motor 4R to the rear wheels 6R. On the other hand, in the process P130, the front motor torque is set to zero.

The controller 101 controls the front inverter 3F so that the front electric motor 4F generates the front motor torque calculated by the execution of the process P130. The controller 101 controls the rear inverter 3R so that the rear electric motor 4R generates the rear motor torque calculated by the execution of the process P140.

1-4. Switching of Output Mode of Virtual Engine Speed

The electric vehicle 100 according to the first embodiment is configured such that the front wheels 6F and the rear wheels 6R can be driven by the front electric motor 4F and the rear electric motor 4R, respectively. Therefore, when a difference occurs between the wheel rotation speed of the front wheels 6F and the wheel rotation speed of the rear wheels 6R, the front motor rotation speed related to the wheel rotation speed of the front wheels 6F and the rear motor rotation speed related to the wheel rotation speed of the rear wheels 6R differ from each other. Such situations, for example, when wheel slip occurs while the electric vehicle 100 is traveling on a low-u road, or the wheels are locked due to braking of the electric vehicle 100.

In the drive control of the electric vehicle 100 according to the first embodiment, the controller 101 calculates a virtual engine speed from the motor rotation speed acquired from the motor speed sensor 15. As described above, the controller 101 has, as the output mode of the virtual engine speed, the first mode in which the virtual engine speed is changed with reference to the front motor rotation speed and the second mode in which the virtual engine speed is changed with reference to the rear motor rotation speed.

In the case where the front motor rotation speed and the rear motor rotation speed are different from each other, the virtual engine speed to be output is different depending on the output mode of the virtual engine speed. In particular, in one of the output modes, the virtual engine speed that does not match the operating state of the drive system of the electric vehicle 100 may be output. For example, a case where the control mode is set to the rear wheel drive mode will be considered. That is, the rear wheels 6R are driven by the rear electric motor 4R. It is assumed that the rear wheels 6R slip while the electric vehicle 100 is traveling on a low-u road. At this time, the front wheels 6F, which are not driving wheels, are not slipping. Therefore, when the output mode of the virtual engine speed is the first mode, the virtual engine speed gradually increases without reflecting the slipping state of the electric vehicle 100. Further, it is assumed that the driver release the accelerator pedal 22. At this time, a negative torque corresponding to engine braking is generated in the rear wheels 6R, which are driving wheels, in accordance with the virtual engine speed. As a result, the wheel rotation speed of the rear wheels 6R starts to decrease greatly. However, when the output mode of the virtual engine speed is set to the first mode, no torque is generated in the front wheels 6F that are not driving wheels, and thus the virtual engine speed is gradually reduced without reflecting the driving state of the electric vehicle 100. Further, if this state continues, the negative torque continues to be generated in the rear wheels 6R, so that the rear wheels 6R start to rotate in the reverse direction while slipping.

The output of the virtual engine speed that does not match the operating state of the drive system of the electric vehicle 100 is not desirable from a viewpoint of controllability of the electric vehicle 100. Further, if the virtual engine speed that does not match the operating state of the drive system is displayed to the driver, the driver feels a sense of discomfort.

Therefore, in order to enable output of an appropriate virtual engine speed in accordance with the operating state of the drive system of the electric vehicle 100, the controller 101 according to the first embodiment is configured to switch the output mode of the virtual engine speed between the first mode and the second mode in accordance with a predetermined condition. The predetermined condition includes the following two viewpoints.

A first viewpoint of the predetermined condition relates to a case where the electric vehicle 100 is braking. When the electric vehicle 100 is braking, the higher one of the wheel rotation speeds of the front wheels 6F and the rear wheels 6R is considered to be the index indicating the operating state of the electric vehicle 100. Therefore, in the first viewpoint, when the front motor rotation speed is higher than the rear motor rotation speed, the output mode of the virtual engine speed is switched to the first mode. When the rear motor rotation speed is higher than the front motor rotation speed, the output mode of the virtual engine speed is switched to the second mode. Thus, the lock state of the wheel due to the braking of the electric vehicle 100 is considered, and the virtual engine speed according to the operating state of the drive system of the electric vehicle 100 can be output.

A second viewpoint of the predetermined condition relates to a case where the electric vehicle 100 is not braking, that is, a case where the electric vehicle 100 is driving or coasting. When the electric vehicle 100 is driven or coasted, the higher one of the slip ratio of the front wheels 6F and the rear wheels 6R is considered to be the index indicating the operating state of the electric vehicle 100. Therefore, in the second viewpoint, when the slip ratio of the front wheels 6F is higher than the slip ratio of the rear wheels 6R, the output mode of the virtual engine speed is switched to the first mode. When the slip ratio of the rear wheels 6R is higher than the slip ratio of the front wheels 6F, the output mode of the virtual engine speed is switched to the second mode. Thus, the slip state of the electric vehicle 100 is taken into consideration, and the virtual engine speed according to the operating state of the drive system of the electric vehicle 100 can be output.

Figure 3:
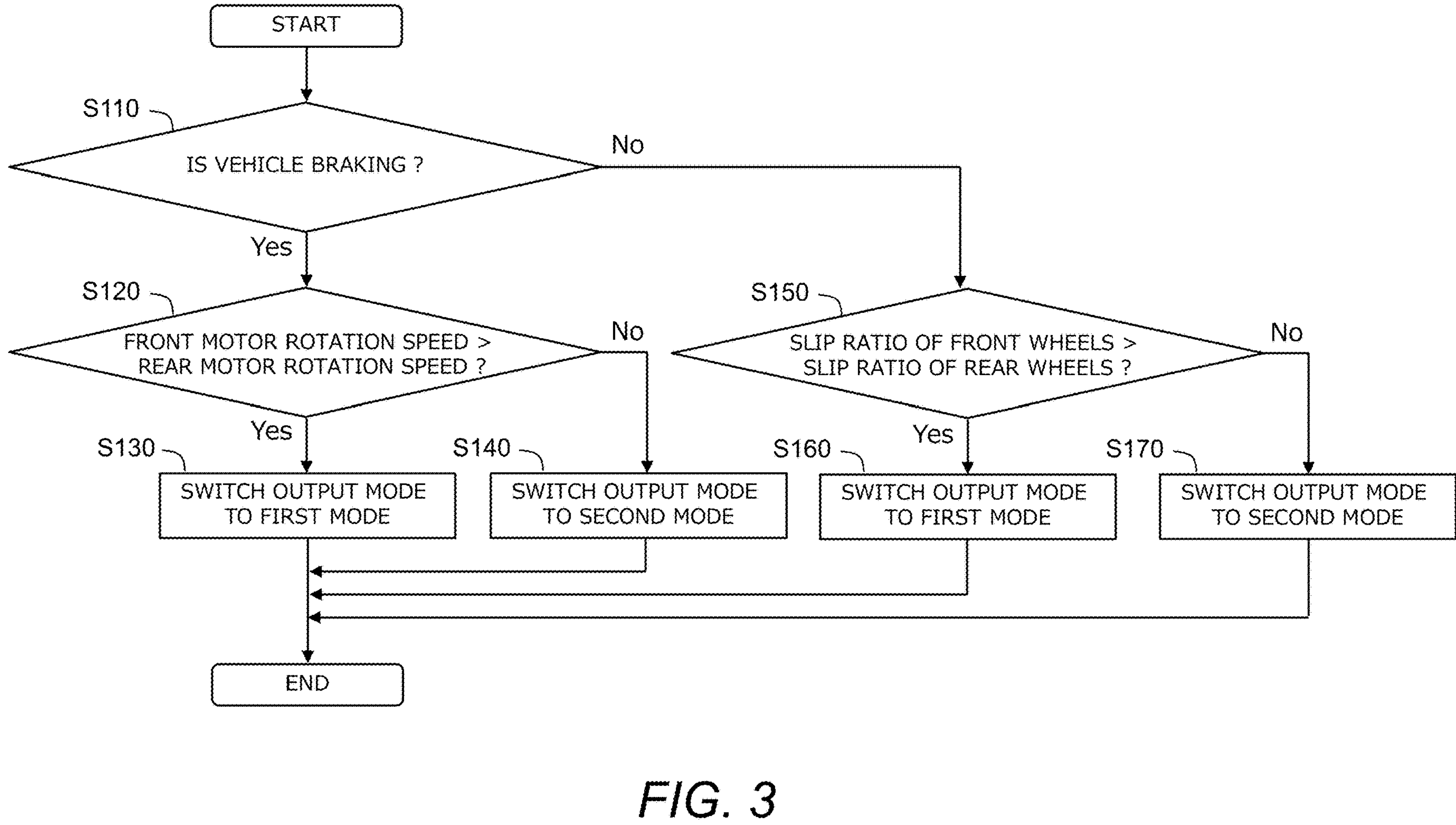
FIG. 3 is a flowchart showing a processing flow related to switching of an output mode of a virtual engine speed by the controller according to the first embodiment.

FIG. 3 is a flowchart showing a processing flow related to switching of the output mode of the virtual engine speed by the controller 101 according to the first embodiment. The processing flow shown in FIG. 3 is repeatedly executed at predetermined processing intervals.

In step S110, the controller 101 determines whether the electric vehicle 100 is braking. The controller 101 can determine whether or not the electric vehicle 100 is braking based on the brake depression amount acquired from the signal from the brake pedal stroke sensor 13. When the electric vehicle 100 is braking (Yes in step S110), the process proceeds to step S120. When the electric vehicle 100 is not braking (No in step S110), the process proceeds to step S150.

In step S120, the controller 101 determines whether or not the front motor rotation speed is higher than the rear motor rotation speed. When the front motor rotation speed is higher than the rear motor rotation speed (step S120; Yes), the controller 101 switches the output mode of the virtual engine speed to the first mode (step S130). On the other hand, when the front motor rotation speed is equal to or less than the rear motor rotation speed (step S120; No), the controller 101 switches the output mode of the virtual engine speed to the second mode (step S140).

In step S150, the controller 101 determines whether or not the slip ratio of the front wheels 6F is higher than the slip ratio of the rear wheels 6R. When the slip ratio of the front wheels 6F is higher than the slip ratio of the rear wheels 6R (step S150; Yes), the controller 101 switches the output mode of the virtual engine speed to the first mode (step S160). On the other hand, when the slip ratio of the front wheels 6F is equal to or less than the slip ratio of the rear wheels 6R (step S150; No), the controller 101 switches the output mode of the virtual engine speed to the second mode (step S170).

The electric vehicle 100 has the four wheel drive mode and the two wheel drive mode as control modes. When the control mode is the two wheel drive mode, only one of the front wheels 6F and the rear wheels 6R serve as the driving wheels. Therefore, when the control mode is the two wheel drive mode, the controller 101 may be configured to fix the output mode of the virtual engine speed to a mode in which the motor rotation speed on the driving wheel side is referred to. That is, as shown in the table of FIG. 4, when the control mode is the front wheel drive mode, the controller 101 fixes the output mode of the virtual engine speed to the first mode. When the control mode is the rear wheel drive mode, the controller 101 fixes the output mode of the virtual engine speed to the second mode. When the control mode is the four wheel drive mode, the controller 101 switches the output mode in accordance with the predetermined condition as described above. With this configuration, it is possible to output the virtual engine speed according to the operating state of the drive system of the electric vehicle 100. Further, it is possible to reduce the processing load related to the switching of the output mode.

1-5. Effect

As described above, according to the first embodiment, the controller 101 calculates the virtual engine speed from the motor rotation speed acquired from the motor speed sensor 15. The controller 101 displays the calculated virtual engine speed on the tachometer 21. The controller 101 controls the torque of the electric motors 4F and 4R in accordance with the operation amount of the accelerator pedal 22, that is accelerator opening, and the virtual engine speed. In particular, according to the first embodiment, the controller 101 switches the output mode of the virtual engine speed between the first mode in which the virtual engine speed is changed with reference to the front motor rotation speed and the second mode in which the virtual engine speed is changed with reference to the rear motor rotation speed, according to the predetermined condition. Thus, it is possible to output an appropriate virtual engine speed according to the operating state of the drive system of the electric vehicle 100.

2. Second Embodiment

Hereinafter, a second embodiment will be described. Note that elements having functions common to those in the first embodiment are denoted by the same reference numerals. In the following description, the contents common to the first embodiment will be omitted or simplified as appropriate.

2-1. Configuration of Power System of Electric Vehicle

Figure 5:
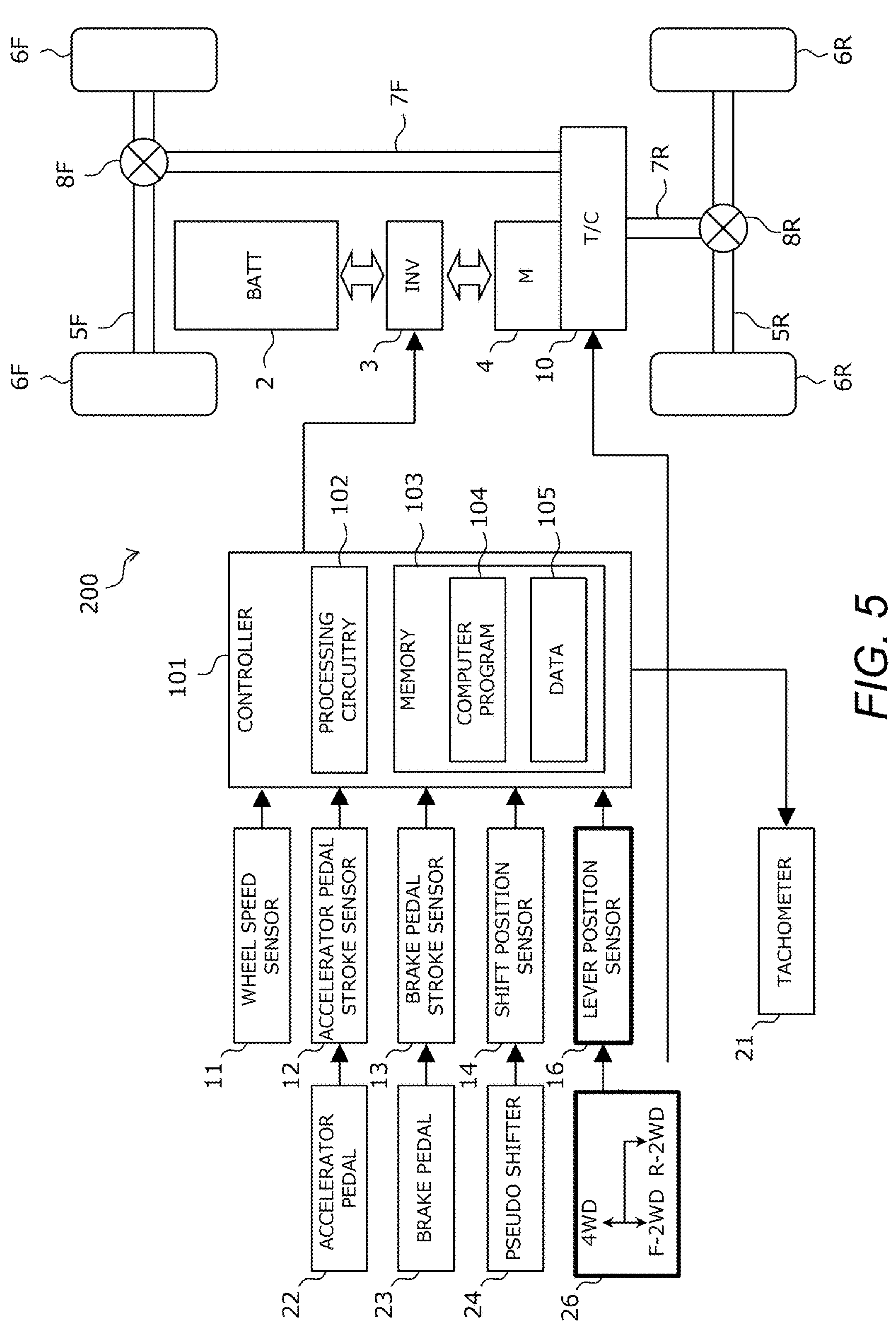
FIG. 5 is a diagram schematically showing a configuration of an electric vehicle according to the second embodiment.

FIG. 5 is a diagram schematically showing a configuration of an electric vehicle 200 according to the second embodiment. First, a configuration of a power system of the electric vehicle 200 will be described with reference to FIG. 5.

The electric vehicle 200 includes an electric motor (M) 4 as a drive source. An inverter (INV) 3 is attached to the electric motor 4. The inverter 3 is connected to a battery (BATT) 2. The inverter 3 is, for example, a voltage type inverter, and controls the torque of the electric motor 4 by PWM control.

The electric vehicle 200 includes a transfer case (T/C) 10. An output shaft of the electric motor 4 is connected to the transfer case 10. The transfer case 10 is connected to a front deferential gear 8F by a front propeller shaft 7F. The front deferential gear 8F is connected to the left and right front wheels 6F by a front drive shaft 5F. The transfer case 10 is connected to a rear deferential gear 8R by a rear propeller shaft 7R. The rear deferential gear 8R is connected to the left and right rear wheels 6R by a rear drive shaft 5R.

The transfer case 10 is a device that switches between four wheel drive and two wheel drive. In particular, the transfer case 10 is configured to be switchable between front wheel drive and rear wheel drive in two wheel drive. The transfer case 10 is connected to a shift device 26 provided in the vehicle interior. The shift device 26 includes a lever (not shown). The driver operates the lever of the shift device 26 to mechanically switch the drive mode among four wheel drive (4WD), front wheel drive (F-2WD), and rear wheel drive (R-2WD). When the four wheel drive mode is selected, the torque of the electric motor 4 is distributed to the front propeller shaft 7F and the rear propeller shaft 7R, and the driving force is transmitted to the front wheels 6F and the rear wheels 6R. In this case, both the front wheels 6F and the rear wheels 6R serve as the driving wheels. When the front wheel drive is selected, the rear propeller shaft 7R is disconnected from the power transmission path in the transfer case 10, and the torque of the electric motor 4 is transmitted only to the front wheels 6F. In this case, only the front wheels 6F serve as the driving wheels. When the rear wheel drive is selected, the front propeller shaft 7F is disconnected from the power transmission path in the transfer case 10, and the torque of the electric motor 4 is transmitted only to the rear wheels 6R. In this case, only the rear wheels 6R serve as the driving wheels.

2-2. Configuration of Control System of Electric Vehicle

Next, a configuration of a control system of the electric vehicle 200 will be described with reference to FIG. 5.

The electric vehicle 200 includes the wheel speed sensors 11. Each of the wheel speed sensors 11 is provided on the left and right front wheels 6F and the left and right rear wheels 6R, respectively. Each of the wheel speed sensors 11 outputs a signal indicating the wheel rotation speed of the left and right front wheels 6F and the wheel rotation speed of the left and right rear wheels 6R.

The electric vehicle 200 is provided with the accelerator pedal stroke sensor 12 and the brake pedal stroke sensor 13. The wheel speed sensors 11 are provided on the left and right front wheels 6F and the left and right rear wheels 6R, respectively. The accelerator pedal stroke sensor 12 is provided on the accelerator pedal 22. The brake pedal stroke sensor 13 is provided on the brake pedal 23.

The electric vehicle 200 includes the pseudo shifter 24. In particular, hereinafter, the pseudo shifter 24 is assumed to be a pseudo paddle shifter which simulates a paddle shifter. The pseudo shifter 24 is provided with the shift position sensor 14.

The electric vehicle 200 includes a lever position sensor 16. The lever position sensor 16 is provided in the shift device 26 and outputs a signal indicating the control mode, that is four wheel drive mode, front wheel drive mode, or rear wheel drive mode, selected by a lever operation.

The electric vehicle 200 includes the tachometer 21. The tachometer 21 is an indicator that displays the virtual engine speed to the driver. The tachometer 21 may be implemented by a part of functions of the HMI (not shown).

The electric vehicle 200 includes the controller 101. Various sensors and devices to be controlled mounted on the electric vehicle 200 are connected to the controller 101 via an in-vehicle network. The controller 101 includes at least the processing circuitry 102 and the memory 103. The memory 103 stores the computer program 104 executable by the processing circuitry 102 and various data 105. The processing circuitry 102 that executes the computer program 104 and the memory 103 cooperate with each other to realize the functions of the controller 101. The memory 103 may be built into the processing circuitry 102.

The controller 101 controls the electric motor 4 in accordance with a driving operation of the driver to perform drive control of the electric vehicle 200. The drive control of the electric vehicle 200 by the controller 101 will be described below.

2-3. Drive Control of Electric Vehicle

FIG. 6 is a diagram showing a configuration of the controller 101 related to drive control of the electric vehicle 200.

A mode signal is input to the controller 101 from the lever position sensor 16. The mode signal includes information on the control mode, that is, four wheel drive mode, front wheel drive mode, or rear wheel drive mode, selected by the lever operation by the driver. The controller 101 executes a process P101 based on the mode signal. In the process P101, the control mode is switched to any one of the four wheel drive mode, the front wheel drive mode, and the rear wheel drive mode in accordance with the mode signal.

As in the first embodiment, the drive control of the electric vehicle 200 by the controller 101 is performed so as to simulate the drive characteristics of the virtual vehicle that is a manual transmission type engine vehicle. For this purpose, the controller 101 initially executes a process P111 for calculating the virtual engine speed of the virtual engine in the virtual vehicle. In the process P111, the virtual engine speed is calculated based on the wheel rotation speed acquired from the wheel speed sensor 11, a total reduction ratio, and the slip ratio of the virtual clutch of the virtual vehicle with reference to the vehicle model MOD01 obtained by modeling the virtual vehicle. The total reduction ratio is obtained by multiplying a gear ratio of the transfer case 10 by the virtual gear ratio obtained from the transmission model MOD13. The slip ratio of the virtual clutch is acquired from the clutch model MOD12. The controller 101 displays the virtual engine speed calculated by the execution of the process P111 on the tachometer 21.

The wheel rotation speed acquired from the wheel speed sensor 11 includes a wheel rotation speed of the front wheels 6F (hereinafter referred to as a "front wheel rotation speed") and a wheel rotation speed of the rear wheels 6R (hereinafter referred to as a "rear wheel rotation speed"). The front wheel rotation speed may be an average value of each of the wheel rotation speeds of the left and right front wheels 6F. The rear wheel rotation speed may be an average value of each of the wheel rotation speeds of the left and right rear wheels 6R. As in the first embodiment, the controller 101 has two output modes, i.e., the first mode and the second mode, for the virtual engine speed calculated in the process P111. However, in the second embodiment, the first mode corresponds to an output mode in which the virtual engine speed is changed with reference to the front wheel rotation speed. The second mode corresponds to an output mode in which the virtual engine speed is changed with reference to the rear wheel rotation speed. The controller 101 is configured to be able to switch the output mode of the virtual rotation speed between the first mode and the second mode. The switching of the output mode of the virtual engine speed in the second embodiment will be described later.

After the execution of the process P111, the controller 101 executes the process P120 for calculating the torque to be generated in the driving wheels. The process P120 is the same as that in the first embodiment. That is, in the process P120, the controller 101 calculates the driving wheel torque according to the operation amount (accelerator opening) of the accelerator pedal 22 and the virtual engine speed calculated in the process P111, using the vehicle model MOD01.

After the execution of the process P120, the controller 101 executes a process P150 for calculating a torque to be generated in the electric motor 4. In the process P150, the torque of the electric motor 4 is calculated so that the driving wheel torque calculated in the process P120 is generated in the driving wheel according to the control mode. The controller 101 controls the inverter 3 so that the electric motor 4 generates the torque calculated by the execution of the process P150.

2-4. Switching of Output Mode of Virtual Engine Speed

As in the first embodiment, in order to enable output of an appropriate virtual engine speed in accordance with the operating state of the drive system of the electric vehicle 200, the controller 101 according to the second embodiment is configured to switch the output mode of the virtual engine speed between the first mode and the second mode in accordance with a predetermined condition.

The same viewpoints as in the first embodiment can be applied to the predetermined condition. That is, in the first viewpoint related to a case where the electric vehicle 200 is braking, the output mode of the virtual engine speed is switched to the first mode when the front wheel rotation speed is higher than the rear wheel rotation speed. When the rear wheel rotation speed is higher than the front wheel rotation speed, the output mode of the virtual engine speed is switched to the second mode. Further, in the second viewpoint related to a case where the electric vehicle 200 is not braking, that is, a case where the electric vehicle 200 is driving or coasting, the output mode of the virtual engine speed is switched to the first mode when the slip ratio of the front wheels 6F is higher than the slip ratio of the rear wheels 6R. When the slip ratio of the rear wheels 6R is higher than the slip ratio of the front wheels 6F, the output mode of the virtual engine speed is switched to the second mode.

Figure 7:
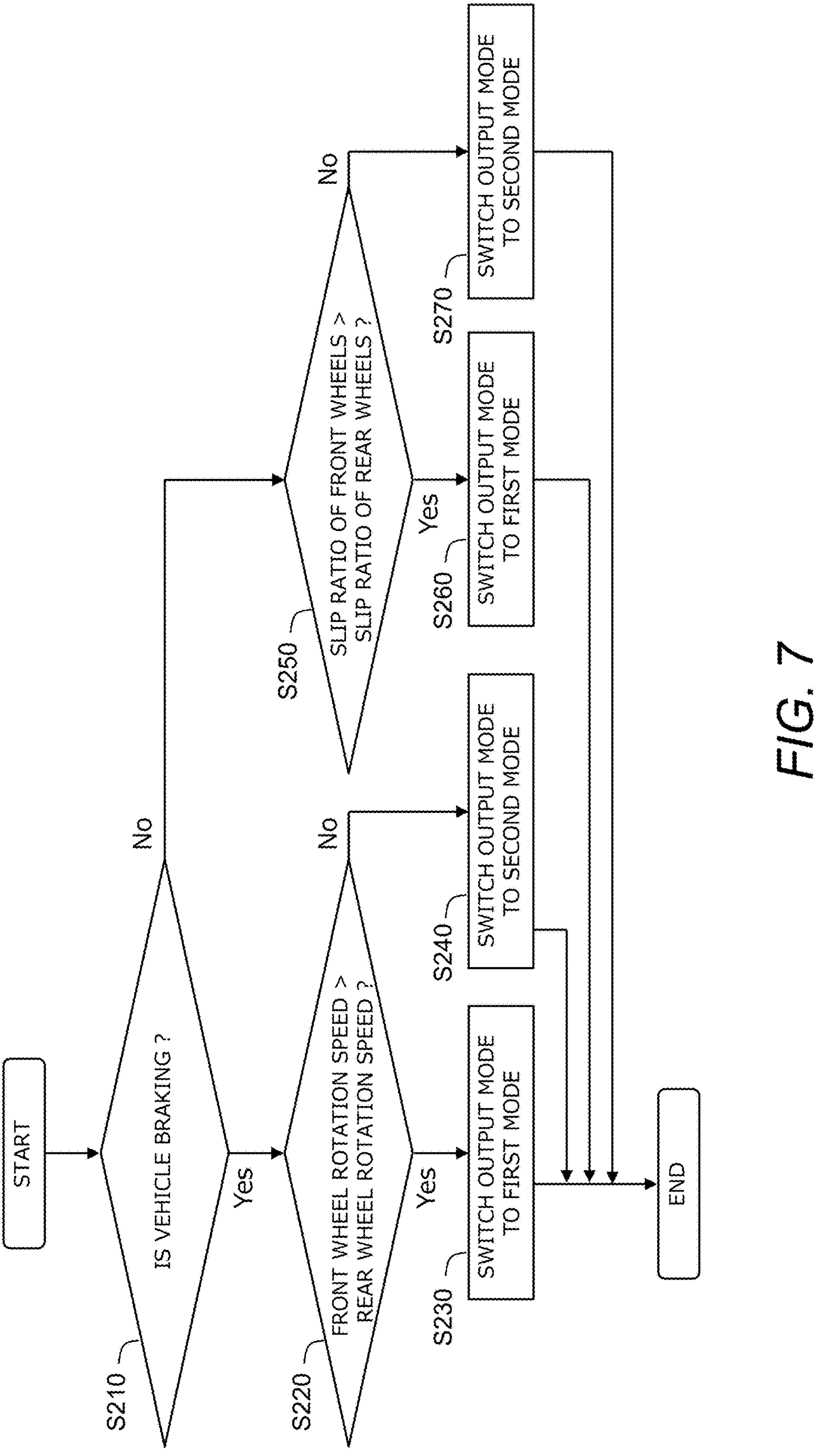
FIG. 7 is a flowchart showing a processing flow related to switching of an output mode of a virtual engine speed by the controller according to the second embodiment.

FIG. 7 is a flowchart showing a processing flow related to switching of the output mode of the virtual engine speed by the controller 101 according to the second embodiment. The processing flow shown in FIG. 7 is repeatedly executed at predetermined processing intervals.

In step S210, the controller 101 determines whether or not the electric vehicle 100 is braking. When the electric vehicle 100 is braking (Yes in step S210), the process proceeds to step S220. When the electric vehicle 100 is not braking (No in step S210), the process proceeds to step S250.

In step S220, the controller 101 determines whether or not the front wheel rotation speed is higher than the rear wheel rotation speed. When the front wheel rotation speed is higher than the rear wheel rotation speed (Yes in step S220), the controller 101 switches the output mode of the virtual engine speed to the first mode (step S230). On the other hand, when the front wheel rotation speed is equal to or lower than the rear wheel rotation speed (No in step S220), the controller 101 switches the output mode of the virtual engine speed to the second mode (step S240).

In step S250, the controller 101 determines whether or not the slip ratio of the front wheels 6F is higher than the slip ratio of the rear wheels 6R. When the slip ratio of the front wheels 6F is higher than the slip ratio of the rear wheels 6R (Yes in step S250), the controller 101 switches the output mode of the virtual engine speed to the first mode (step S260). On the other hand, when the slip ratio of the front wheels 6F is equal to or less than the slip ratio of the rear wheels 6R (No in step S250), the controller 101 switches the output mode of the virtual engine speed to the second mode (step S270).

As in the first embodiment, in the second embodiment, when the control mode is set to the two wheel drive mode, the controller 101 may be further configured to fix the output mode of the virtual engine speed to a mode in which the wheel rotation speed on the driving wheel side is referred to (see FIG. 4). That is, when the control mode is set to the front wheel drive mode, the controller 101 fixes the output mode of the virtual engine speed to the first mode. When the control mode is set to the rear wheel drive mode, the controller 101 fixes the output mode of the virtual engine speed to the second mode. When the control mode is set to the four wheel drive mode, the controller 101 switches the output mode in accordance with the predetermined condition as described above.

2-5. Effect

As described above, according to the second embodiment, the controller 101 calculates the virtual engine speed using the wheel rotation speed acquired from the wheel speed sensor 11. The controller 101 displays the calculated virtual engine speed on the tachometer 21. The controller 101 controls the torque of the electric motor 4 in accordance with the operation amount (accelerator opening) of the accelerator pedal 22 and the virtual engine speed. In particular, according to the second embodiment, the controller 101 switches the output mode of the virtual engine speed between the first mode in which the virtual engine speed is changed with reference to the front wheel rotation speed and the second mode in which the virtual engine speed is changed with reference to the rear wheel rotation speed, in accordance with the predetermined condition. Thus, as in the first embodiment, it is possible to output an appropriate virtual engine speed according to the operating state of the drive system of the electric vehicle 100.

3. Other Embodiments

In addition to the first and second embodiments, the following embodiments can be provided.

A first of the other embodiments is an embodiment in which, in the configuration of the electric vehicle 100 according to the first embodiment, a first mode in which the virtual engine speed is changed with reference to the front wheel rotation speed and a second mode in which the virtual engine speed is changed with reference to the rear wheel rotation speed are adopted as the output mode of the virtual engine speed. This embodiment can be realized by replacing the process P110 in the configuration of the controller 101 according to the first embodiment shown in FIG. 2 with the process P111 according to the second embodiment shown in FIG. 6. Further, the processing flow according to the second embodiment shown in FIG. 7 can be applied to the processing flow related to the switching of the output mode of the virtual engine speed.

A second alternative embodiment is an embodiment, in the configuration of the electric vehicle 200 according to the second embodiment, a first mode in which the virtual engine speed is changed with reference to the rotation speed of the front propeller shaft 7F and a second mode in which the virtual engine speed is changed with reference to the rotation speed of the rear propeller shaft 7R are adopted as the output mode of the virtual engine speed. The rotation speed of the front propeller shaft 7F (the rotation speed before the front differential gear 8F) is a rotation speed (i.e., first rotation speed) associated with the front wheel rotation speed, and the rotation speed of the rear propeller shaft 7R (the rotation speed before the rear differential gear 8R) is a rotation speed (i.e., second rotation speed) associated with the rear wheel rotation speed. Therefore, the rotation speed of the front propeller shaft 7F and the rotation speed of the rear propeller shaft 7R can be used for calculation of the virtual engine speed. In this embodiment, in the configuration of the electric vehicle 200 according to the second embodiment shown in FIG. 5, sensors for detecting the rotation speed of the front propeller shaft 7F and the rotation speed of the rear propeller shaft 7R are further provided, respectively. The processing flow related to the switching of the output mode of the virtual engine speed can be realized by replacing the process P120 in the process flow according to the first embodiment shown in FIG. 3 with a process of comparing the rotation speed of the front propeller shaft 7F with the rotation speed of the rear propeller shaft 7R.

What is claimed is:

1. An electric vehicle having an electric motor as a drive source, comprising:

an indicator to display a virtual engine speed of a virtual engine; and processing circuitry being configured to switch an output mode of the virtual engine speed between a first mode in which the virtual engine speed is changed with reference to a front wheel rotation speed indicating a wheel rotation speed of front wheels of the electric vehicle or a first rotation speed associated with the front wheel rotation speed and a second mode in which the virtual engine speed is changed with reference to a rear wheel rotation speed indicating a wheel rotation speed of rear wheels of the electric vehicle or a second rotation speed associated with the rear wheel rotation speed, in accordance with a predetermined condition.

2. The electric vehicle according to claim 1, wherein when the electric vehicle is being braked, the processing circuitry is configured to:

switch the output mode to the first mode when the front wheel rotation speed is higher than the rear wheel rotation speed or when the first rotation speed is higher than the second rotation speed; and switch the output mode to the second mode when the rear wheel rotation speed is higher than the front wheel rotation speed or when the second rotation speed is higher than the first rotation speed.

3. The electric vehicle according to claim 1, wherein when the electric vehicle is not braking, the processing circuitry is configured to:

switch the output mode to the first mode when a slip ratio of the front wheels is higher than a slip ratio of the rear wheels; and switch the output mode to the second mode when the slip ratio of the rear wheels is higher than the slip ratio of the front wheels.

4. The electric vehicle according to claim 1, wherein the electric vehicle has a control mode including a four wheel drive mode in which both the front wheels and the rear wheels are driven and a two wheel drive mode in which only one of the front wheels and the rear wheels is driven, and the processing circuitry in configured to:

when the control mode is the four wheel drive mode, switch the output mode between the first mode and the second mode in accordance with the predetermined condition; and when the control mode is the two wheel drive mode, fix the output mode to one of the first mode and the second mode, the one of the first mode and the second mode being a mode in which a wheel rotation speed of driving wheels or a rotation speed related to the wheel rotation speed of the driving wheels is referred to.

5. The electric vehicle according to claim 4, wherein

The two wheel drive mode includes a front wheel drive mode in which only the front wheels are driven and a rear wheel drive mode in which only the rear wheels are driven, and the processing circuitry is configured to:

fix the output mode to the first mode when the two wheel drive mode is the front wheel drive mode; and fix the output mode to the second mode when the two wheel drive mode is the rear wheel drive mode.

6. The electric vehicle according to claim 1, wherein the electric motor includes a front electric motor for driving the front wheels and a rear electric motor for driving the rear wheels, the first rotation speed is a motor rotation speed of the front electric motor, and the second rotation speed is a motor rotation speed of the rear electric motor.

7. The electric vehicle according to claim 1, comprising an accelerator pedal, wherein the processing circuitry is configured to change a torque of the electric motor in accordance with an operation amount of the accelerator pedal and the virtual engine speed.

* * * * *